US000001315H

United States Statutory Invention Registration [19]

[11] Reg. Number: H1315

Levine

[43] Published: Jun. 7, 1994

[54] HIGH SPEED OIL SPILL RESPONSE LIGHTER

[76] Inventor: Robert A. Levine, 18430 Kittiwake Cir., Anchorage, Ak. 95516-6103

[21] Appl. No.: 877,002

[22] Filed: May 1, 1992

[51] Int. Cl.[5] ..... B63B 35/44
[52] U.S. Cl. ..... 114/61; 441/4
[58] Field of Search ..... 114/56, 61, 72, 73, 114/74 R, 256, 343, 364; 441/1, 4, 5; 141/279, 382, 383, 387; 414/137.9, 138.5, 138.7, 142.7; 137/615; 210/242.3, 242.1, 241

[56] References Cited

U.S. PATENT DOCUMENTS

| | | | |
|---|---|---|---|
| 1,808,873 | 6/1931 | Weeks | 414/142.7 |
| 3,950,805 | 4/1976 | Murphy | 441/4 |
| 4,867,211 | 9/1989 | Dodge | 441/4 |
| 5,022,487 | 6/1991 | Wells | 114/61 |
| 5,102,540 | 4/1992 | Conradi | 210/242.3 |

FOREIGN PATENT DOCUMENTS

| | | | |
|---|---|---|---|
| 2173453A | 10/1986 | Canada | 114/61 |
| 1111937 | 9/1984 | U.S.S.R. | 114/61 |

*Primary Examiner*—David H. Brown

[57] ABSTRACT

An oil spill response lighter comprising a SWATH vessel or other high speed hull form includes onboard oil storage for transfer from recovery vessels to large capacity storage tanks. The lighter includes an oil loading and unloading conduit supported on a pivotable, extensible support arm mounted on the main hull. A solid waste or debris receptacle is mounted on the deck of the main hull for receiving and unloading debris by an onboard boom type crane. The lighter improves the rate of recovery of marine oil spills by rapid transfer of the contents of limited capacity recovery vessels to large capacity storage tanks.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH SPEED OIL SPILL RESPONSE LIGHTER

BACKGROUND OF THE INVENTION

1. Field of the Invention

The present invention pertains to a high speed oil spill response vessel adapted to transfer recovered oil or similar liquids from a recovery or skimmer vessel to a storage vessel or shore based facility to minimize the delay in oil spill recovery operations resulting from low storage capacity recovery vessels.

2. Background

The continued development of equipment and facilities for the recovery of crude oil and similar liquids from marine oil spills has brought the realization that one factor which delays the recovery operations is the limited storage capacity of most types of available oil skimming or recovery vessels. The skimming and recovery vessels which have proven to be most attractive for use in recovery of oil in remote locations are those which may be rapidly transported by air or surface means to the site of the spill. Such recovery vessels are necessarily limited in their oil storage capacity since, once the recovery vessel's storage tanks are full, the recovery vessel must be taken out of service and transit to a storage ship or shore based storage facility.

The cost of providing large capacity oil recovery and storage ships, such as described in U.S. patent application Ser. No. 07/798,469, filed Nov. 26, 1991, in the name of John L. Sullivan et al and assigned to the assignee of the present invention, makes it practical to base such ships only in areas where a high probability of a spill occurrence exists. Such ships are also limited to relatively deep water and open sea recovery operations. In all events, since a ship of the type described in the aforementioned patent application may also be used in regular liquids transport service, initial efforts to contain or recover spilled oil may also require the use of a number of small recovery and lightering vessels which are capable of working in shallow and relatively inaccessible waters and are easily transportable to the site of the spill until the vessel of opportunity has discharged its load and transited to the site of the spill.

Accordingly, there has developed an acute need for a type of vessel which is capable of repeated high speed transfer of recovered oil from limited capacity recovery or skimmer vessels to a storage vessel or shore based storage facility and return to the site of the spill to take on another load of recovered oil. Such a vessel should also advantageously include features such as fuel and water storage for replenishing supplies of same on the skimmer vessels, the ability to pick up and store debris and the ability to carry and facilitate exchange of skimmer crew. The present invention is directed to such a transfer vessel or lighter which has several unique features as will be described further herein.

SUMMARY OF THE INVENTION

The present invention provides a unique, high speed vessel particularly adapted for use in transferring recovered oil or similar liquids from open sea oil recovery or skimmer vessels which have only limited storage capacity.

In accordance with an important aspect of the present invention there is provided a high speed liquid storage and transfer vessel for lightering recovered oil and similar liquids from oil recovery vessels or skimmers to a large storage capacity barge, ship or shore based facility, which transfer vessel includes substantially all of the desired features described hereinabove including unique equipment and arrangements thereof.

A preferred embodiment of the oil transfer lighter of the present invention is characterized by a high speed hull form such as a SWATH (Small Waterplane Area Twin Hull) type vessel which includes substantial recovered oil storage capacity, debris storage capacity, a unique flexible conduit support arm for liquid loading and unloading and other features required for the purpose of the vessel. Certain of the features of the present invention can be included on other hull forms such as air cushion/surface effect ships, catamaran, planing, deep V and semisubmersible types.

Those skilled in the art will further appreciate the above-described features and advantages of the present invention together with other superior aspects thereof upon reading the detailed description which follows in conjunction with the drawing.

DESCRIPTION OF A PREFERRED EMBODIMENT

Figure 1:
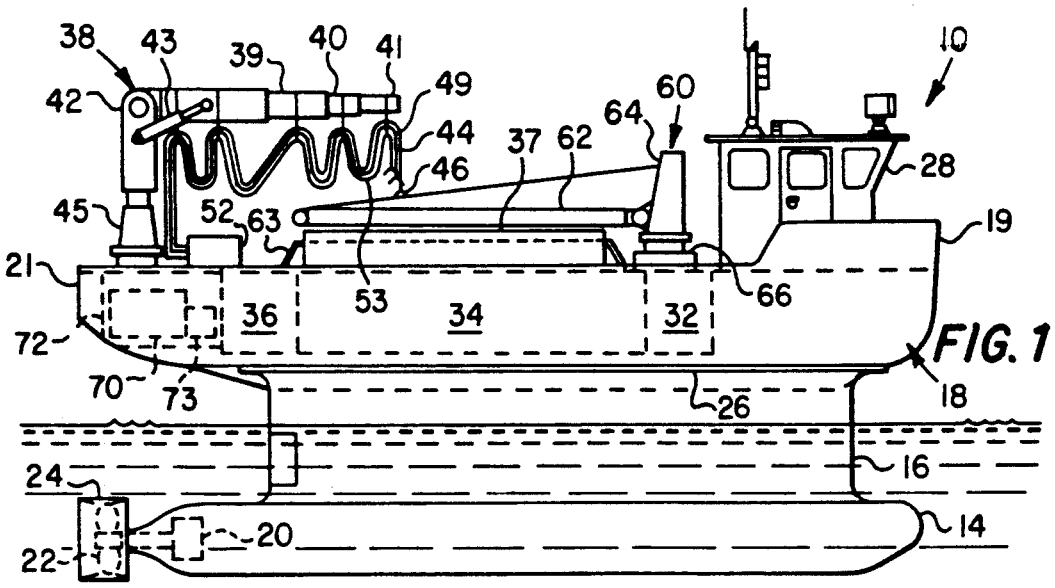
FIG. 1 is a side elevation of an oil spill response lighter in accordance with the present invention.

In the description which follows, like parts are marked throughout the specification and drawing with the same reference numerals, respectively. The drawing figures are not necessarily to scale.

Figure 2:
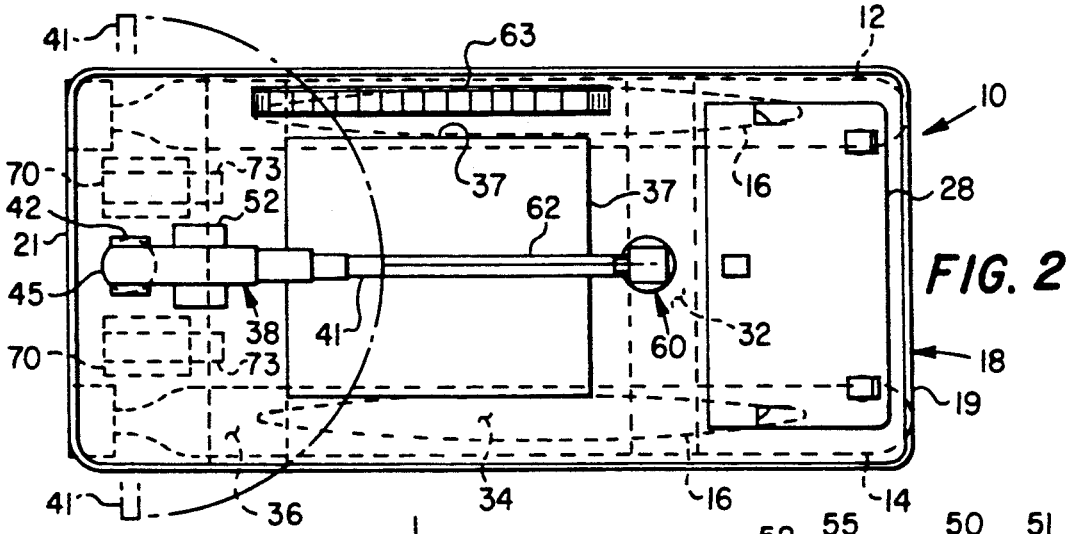
FIG. 2 is a plan view of the vessel illustrated in FIG. 1.
Figure 3:
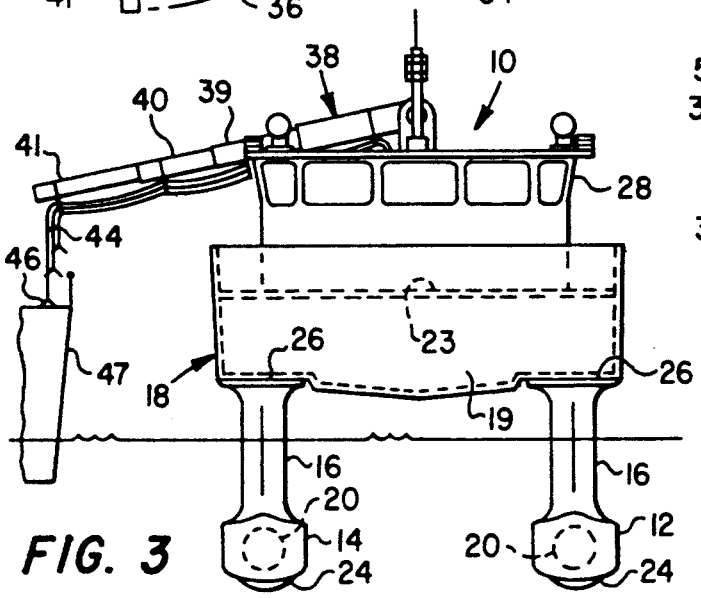
FIG. 3 is a front elevation of the vessel illustrated in FIGS. 1 and 2.

Referring to drawing FIGS. 1 through 3, there is illustrated a unique high speed oil spill transfer vessel in accordance with the present invention and generally designated by the numeral 10. The vessel 10 is characterized as a SWATH type having spaced apart submersible hulls 12 and 14 which each have generally vertically extending fin or strut portions 16 which support an above-water main hull 18. Each of the hulls 12 and 14 is fitted at its aft end with a suitable propulsion motor 20 driving a screw propeller 22 which may be shrouded by a duct 24 to improve propulsion efficiency. The hulls 12 and 14 together with their respective support struts 16 may be constructed in accordance with conventional marine engineering practices and, to facilitate air transportability of the vessel 10, each of the struts 16 may be separated from the main hull 18 at flanged connections 26. Other portions of the vessel 10 may be removable to facilitate transport by surface means or aircraft.

The main hull 18 is configured to have a forward portion 19 and an aft portion 21. A main deck 23 provides a work surface and supports a wheelhouse 28 forward. The deck 23 also overlies suitable storage tanks 32, 34 and 36 for potable water, recovered oil and diesel fuel, for example, respectively. The tanks 32, 34 and 36 preferably extend the breadth of the hull 18 so as to provide adequate capacity. A suitable receptacle 37 is provided on the deck 23 for receiving and storing material such as debris which may be collected during an oil recovery operation.

The vessel 10 includes unique liquid transfer means comprising a telescoping arm, generally designated by the numeral 38, which includes telescoping portions 39, 40 and 41 which may be extended and retracted by suitable means such as one or more hydraulic cylinders or the like, not shown. The arm 38 is mounted on a base portion 42 for pivotal movement about a horizontal axis controlled by an actuator 43. The base portion 42 is suitably mounted on a pedestal 45 for pivotal movement of the arm 38 over either side of the hull 18. The arm 38 supports a flexible conduit or hose 44 whose distal end 46 is fitted with a suitable coupling for connection to the oil recovery tank of a recovery vessel 47, FIG. 3, and for connection to a suitable large-capacity storage tank, not shown, for discharging oil from tank 34. Alternatively, of course, the lighter 10 could be discharging oil into tank means on vessel 47 if such vessel was a large-capacity storage ship. The conduit 44 is connected to suitable pump means 50 disposed in an enclosure 52 on the deck 23, see FIG. 4 also. The arm 38 also supports fuel and water transfer conduits or hoses 49 and 53 in the same manner as the hose 44 for transferring such liquids with respect to the tanks 36 and 32 by suitable pumps, shown in FIG. 4.

The vessel 10 further includes an onboard crane 60 including a boom 62 which is pivotally connected to a base 64. The base 64 is mounted on a pedestal 66 for pivotal movement with respect thereto so that the boom 62 may be swung out over either side of the main hull 18 for general lifting purposes. The crane 60 is preferably mounted just aft of the wheelhouse 28 and may be mounted along the centerline of the hull 18 or to either port or starboard sides of the hull. In FIGS. 1 and 2, the crane 60 is shown in a stowed position, as is the arm 38, which would be the normal position for these devices during high speed transit of the vessel 10.

Power for the propulsion motors 20 as well as the arm 38, the crane 60 and the pump 50 may be supplied by one or more diesel engines 70 shown mounted aft in an engine room 72, FIGS. 1 and 2. The engines 70 may be configured to drive suitable hydraulic pumps 73 which, in turn, drive the propulsion motors 20 as well as a motor 51 for driving the main oil transfer pump 50, FIG. 4. Alternatively, of course, the shipboard power may be all electric or partially electric and, in this regard, one or both of the engines 70 may also drive suitable electrical generator means, not shown. Still further, the propulsion motors 20 may also be self-contained internal combustion engines mounted in the respective hulls 12 and 14 or mounted in the main hull 18 and driving the propellers 22 through gear drive mechanisms or the like, not shown.

The vessel 10 may be constructed using conventional marine vessel fabrication materials and techniques and should be of a size and configuration as to be capable of transport by large cargo aircraft such as U.S. Air Force C-130, C-141 or C-5 type. A typical configuration of the vessel 10 would have an overall length of 41 feet to 75 feet, a draft of 6 feet, maximum loaded, a speed of a least 20 knots in open water with a full load and a range of 500 nautical miles. Capacities for recovered oil should be approximately 300 barrels (12,600 gallons). Capacities for potable water and diesel fuel should be in the range of 1,000 gallons and 2,000 gallons, respectively. Deck storage of debris in the receptacle 36 should be in the range of about 10 cubic yards. A gangway 63 is shown stored on deck 23 and is movable by crane 60 into a suitable position to facilitate crew changes on the skimmers, for example.

Figure 4:
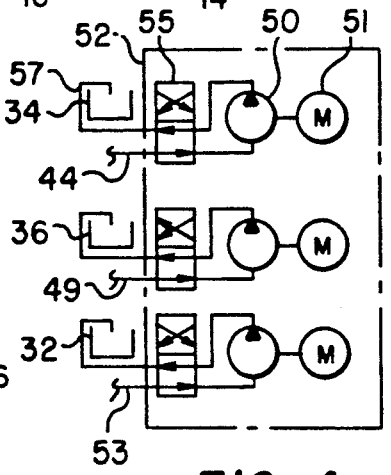
FIG. 4 is a schematic diagram of the pumping system for loading and offloading the recovered oil.

FIG. 4 illustrates one arrangement of a pump 50 for use with the loading and discharge conduit 44. In the arrangement shown in FIG. 4 the pump 50 is driven by motor 51 and the pump suction and discharge lines may be reversed through a suitable valve 55. In this way the pump 50 may be used for loading oil by way of the conduit 44 from the recovery or skimmer vessel 47 and then also used to discharge oil from the tank 34 to a suitable storage facility. In the schematic diagram of FIG. 4, a conduit 57 is illustrated and is in communication with tank 34 and valve 55. FIG. 4 also illustrates similar pump and valving arrangements for transferring fuel and water with respect to the tanks 36 and 32 via the hoses 49 and 53.

Although the vessel 10 is shown configured as a SWATH type vessel it is contemplated by the present invention that the hull design could also comprise an air cushion or surface effect type vessel, catamaran, a conventional displacement hull, a so-called deep V hull or another type which would be capable of high speed transit fully loaded in the open sea. The vessel should also have accommodations for a crew of three and ten passengers for crew changes on the skimming or recovery vessels which are visited frequently by the vessel 10. Conventional, state of the art navigation and radio equipment would be also provided on board the vessel 10 A capacity to load and discharge in about fifteen minutes or less together with transit time of at least five miles in fifteen minutes, to support existing types of skimmers and other oil recovery vessels is of the utmost importance.

Experience with recent, significant oil spills has indicated that existing skimmers and recovery vessels reach full capacity in two hours or less. Moreover, discharging recovered oil from a conventional oil recovery vessel is complicated by weather conditions, the question of whether or not the skimmer may be brought to the storage vessel or vice versa, due to water depth and crowded or inaccessible waterways, for example, and whether or not certain types of skimmer gear such as sweeps or booms can be detached or stowed before the recovery vessel can be brought alongside a larger storage vessel. Thanks to the provision of a high speed vessel like the lighter 10 together with its extensible conduit support arm 38, which may be telescopically extended from either side of the vessel, and the significant storage capacity of the tank 34 such a vessel can be an attractive and unique part of an oil spill recovery operation.

Although a preferred embodiment of the invention has been described in detail herein, those skilled in the art will recognize that certain features may be substituted for those described and shown without departing from the scope and spirit of the invention as recited in the appended claims.

What is claimed is:

1. A high speed lighter for use in transferring oil, characterized by:

a main hull including a storage tank for storing oil, said main hull being supported above the water plane on two spaced apart, submersible hulls;

a propulsion motor in each of said submersible hulls for propelling said lighter in the open ocean at speeds of at least about 15 knots;

conduit means on said lighter for receiving and discharging oil from said storage tank, respectively;

a pump on said lighter including a discharge line for discharging oil through said conduit means and for receiving oil through said conduit means, respectively;

valve means for selectively connecting said discharge line to said conduit means and to said storage tank, respectively;

means extensible from one or the other of opposite sides of said main hull comprising a base part supported on said main hull and a telescoping arm supported on and pivotable about said base part, said telescoping arm including means for supporting said conduit means for selectively positioning one end of said conduit means over one or the other of said opposite sides of said main hull for receiving and discharging oil with respect to said lighter;

means for storing material on said lighter; and a crane supported on said main hull for loading and unloading said material with respect to said lighter.

* * * * *